US010657765B2

(12) United States Patent
Krastiņš et al.

(10) Patent No.: US 10,657,765 B2
(45) Date of Patent: May 19, 2020

(54) IMAGE PROCESSING UNIT FOR DETECTING ROULETTE WHEEL BIAS

(71) Applicant: EVOLUTION MALTA LTD, Sliema (MT)

(72) Inventors: Janis Krastiņš, Ikskile (LV); Tania Johannisone-Melkvista, Sliema (MT); Snežana Lipovska, Riga (LV)

(73) Assignee: EVOLUTION MALTA LTD (MT)

( * ) Notice: Subject to any disclaimer, the term of this patent is extended or adjusted under 35 U.S.C. 154(b) by 0 days.

(21) Appl. No.: 16/069,441

(22) PCT Filed: Jan. 12, 2017

(86) PCT No.: PCT/EP2017/050536
§ 371 (c)(1),
(2) Date: Jul. 11, 2018

(87) PCT Pub. No.: WO2017/121783
PCT Pub. Date: Jul. 20, 2017

(65) Prior Publication Data
US 2019/0012877 A1 Jan. 10, 2019

(30) Foreign Application Priority Data

Jan. 12, 2016 (SE) ...................................... 1650026

(51) Int. Cl.
*G07F 17/32* (2006.01)
*A63F 5/00* (2006.01)
(Continued)

(52) U.S. Cl.
CPC ........ *G07F 17/3241* (2013.01); *G06T 7/0002* (2013.01); *G06T 7/70* (2017.01);
(Continued)

(58) Field of Classification Search
CPC ...... G06K 9/00771; G06T 2207/10016; G06T 2207/30232; G06T 7/0002; G06T 7/70;
(Continued)

(56) References Cited

U.S. PATENT DOCUMENTS 6,250,632 B1 6/2001 Albrecht
2003/0060263 A1* 3/2003 Pearce ...................... A63F 5/00
463/17
(Continued)

FOREIGN PATENT DOCUMENTS

CN 104 415 531 A 3/2015
EP 2 814 010 A1 12/2014
GB 2 429 928 A 3/2007

*Primary Examiner* — Jessica M Prince
(74) *Attorney, Agent, or Firm* — Joseph T. Leone, Esq.; DeWitt LLP

(57) ABSTRACT

Image processing unit (3), and method (300), for detecting event data during a game round of a roulette wheel (1) via a camera (2), thereby enabling detection of a roulette wheel bias. The roulette wheel (1) comprises a ball track (11A), upon which a roulette ball (14) is brought into rotation around the roulette wheel (1), and a sloping lower ball track (11B) comprising ball deflectors (13, 15), encircling a rotor (7). The image processing unit (3) is configured for: receiving a captured image of the roulette ball (14) from the camera (2); detecting that the roulette ball (14), under influence of gravity, reaches an imaginary circle (17) encircling the ball deflectors (13, 15) of the lower ball track (11B); and determining a position where it is detected that the roulette ball (14) reaches the imaginary circle (17); and storing the determined position in a database (6).

9 Claims, 2 Drawing Sheets

(51) Int. Cl.
　　　*G06T 7/70*　　　　(2017.01)
　　　*G06T 7/00*　　　　(2017.01)
　　　*H04N 5/232*　　　(2006.01)
　　　*G06K 9/00*　　　　(2006.01)

(52) U.S. Cl.
　　　CPC ....... *G07F 17/322* (2013.01); *H04N 5/23229* (2013.01); *G06K 9/00771* (2013.01); *G06T 2207/10016* (2013.01); *G06T 2207/30232* (2013.01)

(58) Field of Classification Search
　　　CPC .............. G07F 17/322; G07F 17/3241; H04N 5/23229; A63F 5/00; A63F 5/0005; A63F 5/0029; A63F 5/0035; A63F 5/02; A63F 5/04
　　　See application file for complete search history.

(56) References Cited

U.S. PATENT DOCUMENTS

| | | | |
|---|---|---|---|
| 2007/0004491 A1 | 1/2007 | Gioia et al. | |
| 2009/0174141 A1* | 7/2009 | Witty | A63F 5/00 273/142 E |
| 2014/0098219 A1* | 4/2014 | Berry, III | G07F 17/32 348/125 |
| 2014/0148251 A1* | 5/2014 | Nordahl | G07F 17/3206 463/31 |
| 2015/0238848 A1 | 8/2015 | Kuhn et al. | |
| 2016/0354681 A1* | 12/2016 | Adams | A63F 5/007 |
| 2017/0136344 A1* | 5/2017 | Acton | A63F 5/00 |

\* cited by examiner

IMAGE PROCESSING UNIT FOR DETECTING ROULETTE WHEEL BIAS

TECHNICAL FIELD

Implementations described herein generally relate to an image processing unit and a method for detecting event data during a game round of a roulette wheel via a camera, thereby enabling detection of a roulette wheel bias.

BACKGROUND

The game of roulette requires that each roulette wheel is well balanced and without defects in order to generate an even distribution of probabilities for all the numbers of the roulette wheel. This is important both from the perspective of the player and the casino, as the winning number of the roulette wheel will become affected. Further, the affected features of a particular roulette wheel may be exploited by an observant player, i.e. a certain outcome of a round may be more frequently appearing than the theoretical probability, leading to a potential loss to the casino.

It is thus important to continuously monitor and check each roulette wheel of a casino, in order to detect any tendencies to defects or bias at an early stage.

Such defect or bias may be the result of dust, dirt and/or body exudate emitted by the croupier, errors of the roulette wheel due to mistakes during the wheel manufacturing process, etc. Also the table on which the roulette wheel is placed may be uneven or non-horizontal. It may also be the result of manipulation or inadvertent placing of the roulette wheel.

A possible method to track a roulette wheel bias may be to continuously keep track of the historical outcome of numbers of the roulette wheel. A problem with this method is that it is reactive, not proactive; i.e. it is only possible to afterwards detect that the roulette wheel has had a bias so serious that the outcome has been affected. Thus such statistical methods based on winning number analysis alone is insufficient. It would be desired to spot any tendencies of deviation from an expected outcome of the roulette wheel at a very early stage, preferably in a proactive manner, before the winning number statistics of the roulette wheel is affected.

Document U.S. Pat. No. 8,028,993 B2 describes a roulette wheel comprising three ball detectors/sensors for detecting a ball and determining where the ball drops into the rotor of the roulette wheel. The sensors are in-built in the roulette wheel. Thereby, a drop zone bias may be detected by storing the detected respective zones where the ball drops into the rotor. A first problem with this approach is that the number of sensors is limited to three sensors; thereby also the number of drop zones becomes limited, which is insufficient for an accurate drop zone determination. A second problem is that only particular roulette wheels having the ball detectors in-built could be used. It would be desired to instead discover a general method for detecting any roulette wheel bias which is applicable on any arbitrary roulette wheel.

Document US20140098219A1 describes a method for identifying defects in a roulette wheel. A first trajectory of a roulette ball may be determined after launch of the roulette ball by capturing movement of the roulette ball on the roulette wheel. The determining step may be repeated to determine additional trajectories, and a plurality of areas that the roulette ball avoided during travel along the trajectories may be identified. A graphical representation of the plurality of avoided areas may be generated to identify regions of the roulette wheel that include defects.

Thereby, much data has to be stored, which consumes processing resources and also delay the processing.

Document EP2814010A1 relates to a method for immersive roulette gaming. The methods comprise receiving video data from a plurality of image sensors; detecting a ball on a roulette wheel based on the video data using a hardware processor; obtaining motion data about the ball based on the video data using the hardware processor; determining whether the ball is about to fall into a pocket of the roulette wheel based on the video data using the hardware processor; and producing multiple slow-motion images of the ball in response to determining that the ball is about to fall into a pocket on the roulette wheel.

The described solution does not concern detection of a roulette wheel bias at all but rather a solution for providing immersive roulette gaming.

It is thus desired to improve roulette wheel bias tracking.

SUMMARY

It is therefore an object to obviate at least some of the above mentioned disadvantages and to detect event data during a game round of a roulette wheel, thereby enabling detection of a roulette wheel bias.

This and other objects are achieved by the features of the appended independent claims. Further implementation forms are apparent from the dependent claims, the description and the figures.

According to a first aspect, an image processing unit is provided. The image processing unit aims at detecting event data during a game round of a roulette wheel via a camera. Thereby, the detection of a roulette wheel bias is enabled. The roulette wheel comprises a ball track upon which a roulette ball is brought into rotation around the roulette wheel, and a sloping lower ball track comprising ball deflectors, encircling a rotor. The image processing unit is configured for receiving at least one captured image of the roulette ball from the camera. Further, the image processing unit is configured for detecting that the roulette ball, under influence of gravity, reaches an imaginary circle encircling the ball deflectors of the lower ball track. In addition, the image processing unit is further configured for determining a position where it is detected that the roulette ball reaches the imaginary circle. Also, the image processing unit is configured for storing the determined position in a database. Thereby, detection of a roulette wheel bias is enabled by detecting a deviation from collected and stored statistics of a plurality of game rounds.

According to a second aspect, a method is provided. The method aims at detecting event data during a game round of a roulette wheel, via a camera. Thereby, detection of a roulette wheel bias is enabled. The roulette wheel comprises a ball track, upon which a roulette ball is brought into rotation around the roulette wheel and a sloping lower ball track comprising ball deflectors, encircling a rotor. The method comprises detecting that the roulette ball, under influence of gravity, reaches an imaginary circle encircling the ball deflectors of the lower ball track. Further, the method also comprises determining a position where it is detected that the roulette ball reaches the imaginary circle. In addition, the method furthermore comprises storing the determined position in a database. Thereby, detection of a roulette wheel bias is enabled by detecting a deviation from collected and stored statistics of a plurality of game rounds.

By using an external camera and an image processing software for detecting when the ball reaches the drop zone, a continuous set of drop zone positions may be detected. Thereby, an infinite number of drop zone positions may be determined, leading to a more sensitive bias detection. Thereby a defect of the roulette wheel may be detected at an early stage, such as before the resulting winning number of the roulette wheel is affected.

In addition, the external camera may, according to some alternative embodiments, also detect other event data such as e.g. that the roulette ball is reaching a pre-defined area in a proximity of one ball deflector and/or that the roulette ball, under influence of gravity, reaches a second imaginary circle encircling the rotor. Thereby further sensibility and reliability of the roulette wheel bias detection is achieved.

Further, any kind of roulette wheel from any manufacturer may be monitored according to the disclosed solution, as no internal in-built sensors are utilised.

Yet another advantage according to some embodiments, when a roulette wheel is used on an online casino, is that the same camera which is utilised for displaying the roulette wheel for the online players may be used for providing images to the image processing unit. Thus no additional sensor hardware is required for performing the disclosed method. Thereby an improved roulette wheel bias detection is provided.

Other objects, advantages and novel features of the described aspects will become apparent from the following detailed description.

BRIEF DESCRIPTION OF THE DRAWINGS

Various embodiments are described in more detail with reference to attached drawings, illustrating examples in which.

DETAILED DESCRIPTION

Embodiments of the invention described herein are defined as an image processing unit and a method of image processing, which may be put into practice in the embodiments described below. These embodiments may, however, be exemplified and realised in many different forms and are not to be limited to the examples set forth herein; rather, these illustrative examples of embodiments are provided so that this disclosure will be thorough and complete.

Still other objects and features may become apparent from the following detailed description, considered in conjunction with the accompanying drawings. It is to be understood, however, that the drawings are designed solely for purposes of illustration and not as a definition of the limits of the herein disclosed embodiments, for which reference is to be made to the appended claims. Further, the drawings are not necessarily drawn to scale and, unless otherwise indicated, they are merely intended to conceptually illustrate the structures and procedures described herein.

Figure 1:
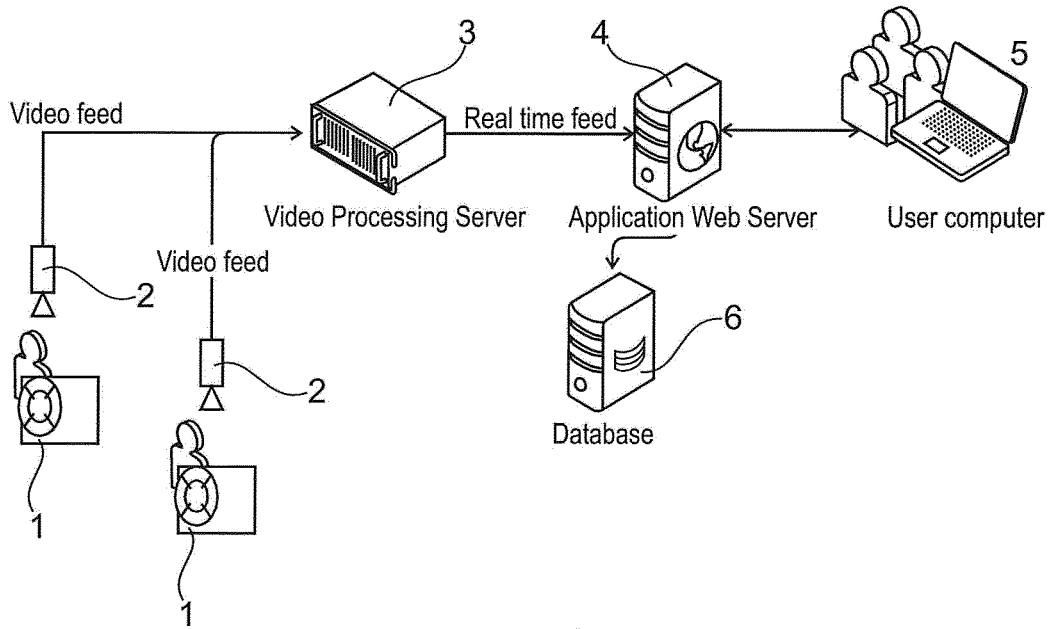
FIG. 1 is a schematic view illustrating a system according to an embodiment of the invention.

FIG. 1 is a schematic illustration over a scenario of an online casino, wherein a set of roulette wheels 1 is monitored by a camera 2. Each roulette wheel 1 is monitored by one camera 2. The camera 2 monitors the game of the roulette wheel 1 and provide captured images to a video processing servers, or image processing unit 3. The roulette wheel 1 is situated on a table or similar, and is operated by a croupier.

The image processing unit 3 may in turn provide processed images to an application web server 4, from which online players may participate in the game via a user computer 5.

Alternatively, another camera may be used in some embodiments, for providing live images of the game to the online players, e.g. for presenting the roulette wheel from an angle.

Images of the roulette wheel 1 and for example results concerning the winning number may be stored in a database 6.

When playing roulette, whether online or live, the player has a variety of betting options. For example, the player may choose to place bets on either a single number or a range of numbers; the colours red or black; or whether the number is odd or even. To determine the winning number and colour, the croupier spins the rotor of the roulette wheel 1 in one direction, then spins a ball in the opposite direction around a tilted circular track running around the circumference of the roulette wheel 1. The croupier may spin the rotor in clockwise direction, or alternatively in counter clockwise direction.

The ball eventually loses momentum and under influence of gravity, falls onto the rotor and into one of 37 (in French/European roulette) or 38 (in American roulette) coloured and numbered pockets on the rotor. The payout odds for each type of bet are based on its probability.

Players can continue to place bets as the ball spins around the roulette wheel 1 until the dealer announces that no more bets are allowed.

When a winning number and colour is determined by the roulette wheel 1, the croupier will then sweep away all other losing bets either by hand or rake, and determine all of the pay-outs to the remaining inside and outside winning bets. When the croupier is finished making pay-outs, the marker is removed from the board where players collect their winnings and make new bets. The winning chips remain on the board.

FIG. 1 thus discloses a system for detecting and storing event data during a game round of a roulette wheel 1, thereby enabling detection of a roulette wheel bias. The roulette wheel 1 comprises a ball track, upon which a roulette ball is brought into rotation around the roulette wheel 1, and a sloping lower ball track comprising ball deflectors, encircling a rotor. The system comprises the camera 2 directed towards the roulette wheel 1, configured for capturing at least one image of the roulette ball when rotating within the lower ball track of the roulette wheel 1. Further the system comprises the image processing unit 3 and the database 6 configured for storing the determined position.

Figure 2:
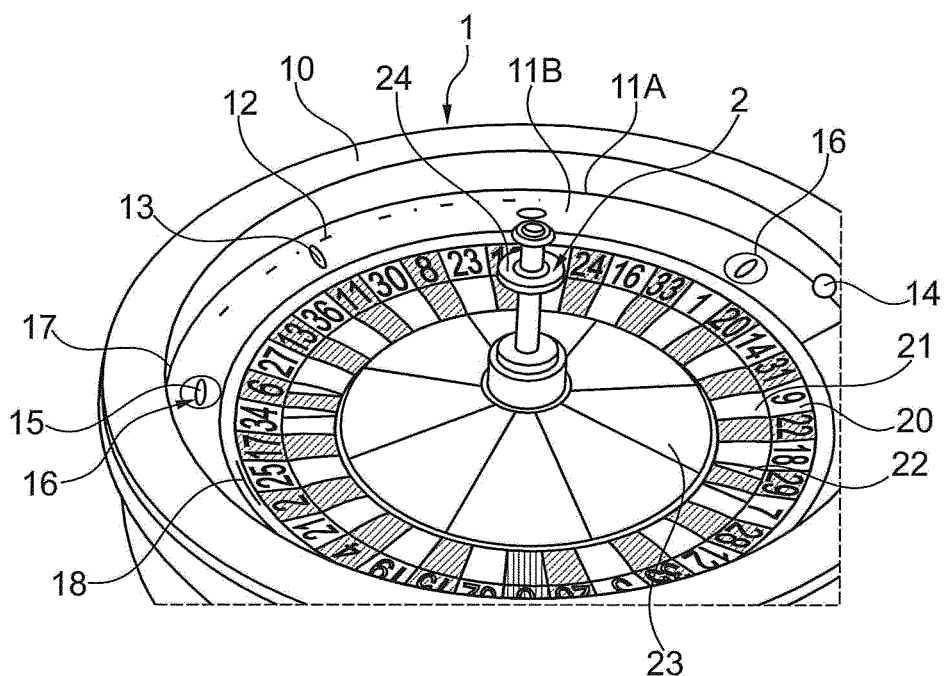
FIG. 2 is a perspective view illustrating a roulette wheel according to an embodiment of the invention.

FIG. 2 illustrates a roulette wheel 1. The roulette wheel 1 comprises a rotor 7. The rotor 7 comprises 37 or 38 ball pockets 21, each associated with a coloured number plate 20. The ball pockets 21 are separated from each other by separating walls 22. Inside the ring of ball pockets 21, a cone 23 is situated. The cone 23 is sloping down towards the ring of ball pockets 21, thereby forcing the ball 14 to end up in one of the ball pockets 21 at the end of each round.

The roulette wheel 1 further comprises a bowl rim 10 around the roulette wheel 1. Further, the roulette wheel 1 comprises a ball track 11A, upon which a roulette ball 14 is brought into rotation around the roulette wheel 1, and a sloping lower ball track 11B comprising ball deflectors 13, 15, encircling the rotor 7.

The ball deflectors 13, 15 of the lower ball track 11B are of two kinds. Some ball deflectors 13 are vertically extended and some other ball deflectors 15 are horizontally extended. Both types of ball deflectors 13, 15 may be diamond shaped and thus referred to as diamonds. Typically, there are four vertically extended ball deflectors 13 and four horizontally extended ball deflectors 15 on the lower ball track 11B around the roulette wheel 1, intermixed with each other.

When a game round is initiated, the croupier starts rotating the rotor 7 via the turret 24 (or alternatively via the ball pockets 21 of the rotor 7) in one rotational direction and then starts spinning the ball 14 around the ball track 11A of the roulette wheel 1 in the opposite rotational direction. As the ball 14 loses momentum, gravitation will gradually drag the ball down to the lower ball track 11B.

The camera 2 is monitoring the roulette wheel 1 from above during all the game round and/or during a set of game rounds, and captured images are forwarded to the image processing unit 3. The camera 2 may in some embodiments, in case of online casino, be further configured for monitoring the game round of the roulette wheel 1 and possibly provide captured images to the remote player, in some embodiments.

The image processing unit 3 detects when the ball 14 reaches an imaginary circle 17 encircling the ball deflectors 13, 15 of the lower ball track 11B, and determine a position where it is detected that the roulette ball 14 reaches the imaginary circle 17. The imaginary circle 17 encircling the ball deflectors 13, 15 may be touching the upper end of a subset of vertically extended ball deflectors 13 in some embodiments.

The position may be determined by dividing the roulette wheel 1 into a number of drop zones such as e.g. angular drop zones. Statistics concerning determined drop zone positions may then be stored in the database 6.

By collecting and storing drop zone statistics for each roulette wheel 1, for a large number of game rounds such as the 50 latest game rounds, the 100 latest game rounds, the 1000 latest game rounds, etc., a deviation from an expected distribution of drop zone statistics is detected. In some embodiments, a deviation exceeding a predetermined value (such as e.g. 5%, 10%, 15% etc.) from an expected distribution of drop zone statistics may generate an alert.

Thereby, the croupier or any other operator may be alerted and the roulette wheel 1 may be closed for further gaming until appropriate maintenance, check and/or cleaning has been made.

It is thereby avoided that gaming is made with a defect roulette wheel 1, already before the even distribution of probabilities for the numbers of the roulette wheel 1 is affected, providing security both to the casino and the engaged players.

In some embodiments, the image processing unit 3 may be further configured for detecting that the roulette ball 14 is reaching a pre-defined area 16 in a proximity of one ball deflector 13, 15. Further, the image processing unit 3 may be configured for determining an identity of said ball deflector 13, 15.

The pre-defined area 16 may in some embodiments be shaped like a conic section, like an ellipse, an oval, a circle etc., in the proximity of each ball deflector 13, 15.

The ball deflectors 13, 15 of the lower ball track 11B may comprise a first subset of horizontally extended ball deflectors 15 and a second subset of vertically extended ball deflectors 13 in some embodiments. The horizontally extended ball deflectors 15 of the first subset may be separated by a vertically extended ball deflector 13 of the second subset, such that every second ball deflector 13, 15 is horizontally extended and every other second ball deflector 13, 15 is vertically extended. In a typical scenario, the lower ball track 11B comprises four horizontally extended ball deflectors 15 and four vertically extended ball deflectors 13, intermixed with each other.

Statistics concerning the determined ball deflector identity may then be stored in the database 6.

By collecting and storing ball deflector identity statistics for each roulette wheel 1, for a large number of game rounds such as the 50 latest game rounds, the 100 latest game rounds, the 1000 latest game rounds, etc., a deviation from an expected distribution of statistics may be detected. In some embodiments, a deviation exceeding a predetermined value (such as e.g. 5%, 10%, 15% etc.) from the expected distribution of statistics may generate an alert.

Thereby, another game parameter is collected and analysed which may provide an earlier detection of a roulette wheel bias. Alternatively, the bias may be confirmed more securely in some embodiments.

Furthermore, the image processing unit 3 may be further configured for detecting that the roulette ball 14, under influence of gravity, reaches a second imaginary circle 18 encircling the rotor 7. The image processing unit 3 may also be configured for determining a second position where it is detected that the roulette ball 14 reaches the second imaginary circle 18.

The determined second position may be stored in the database 6 in some embodiments.

By collecting and storing statistics concerning when the ball 14 hits the rotor 7 for each roulette wheel 1, for a large number of game rounds such as the 50 latest game rounds, the 100 latest game rounds, the 1000 latest game rounds, etc., a deviation from an expected distribution of statistics is detected. In some embodiments, a deviation exceeding a predetermined value (such as e.g. 5%, 10%, 15% etc.) from an expected distribution of statistics may generate an alert.

Thereby, yet another game parameter is collected and analysed which may provide an even earlier detection of a roulette wheel bias. Alternatively, the bias may be confirmed more securely in some embodiments, providing additional trust to the disclosed method and system.

In some embodiments, the image processing unit 3 may be configured for determining a continuous position where the roulette ball 14 reaches the imaginary circle 17 and/or determining a continuous second position where the roulette ball 14 reaches the second imaginary circle 18.

Furthermore, according to some embodiments, the image processing unit 3 may be configured for processing images captured by the camera 2 when the roulette ball 14 reaches the imaginary circle 17.

Figure 3:
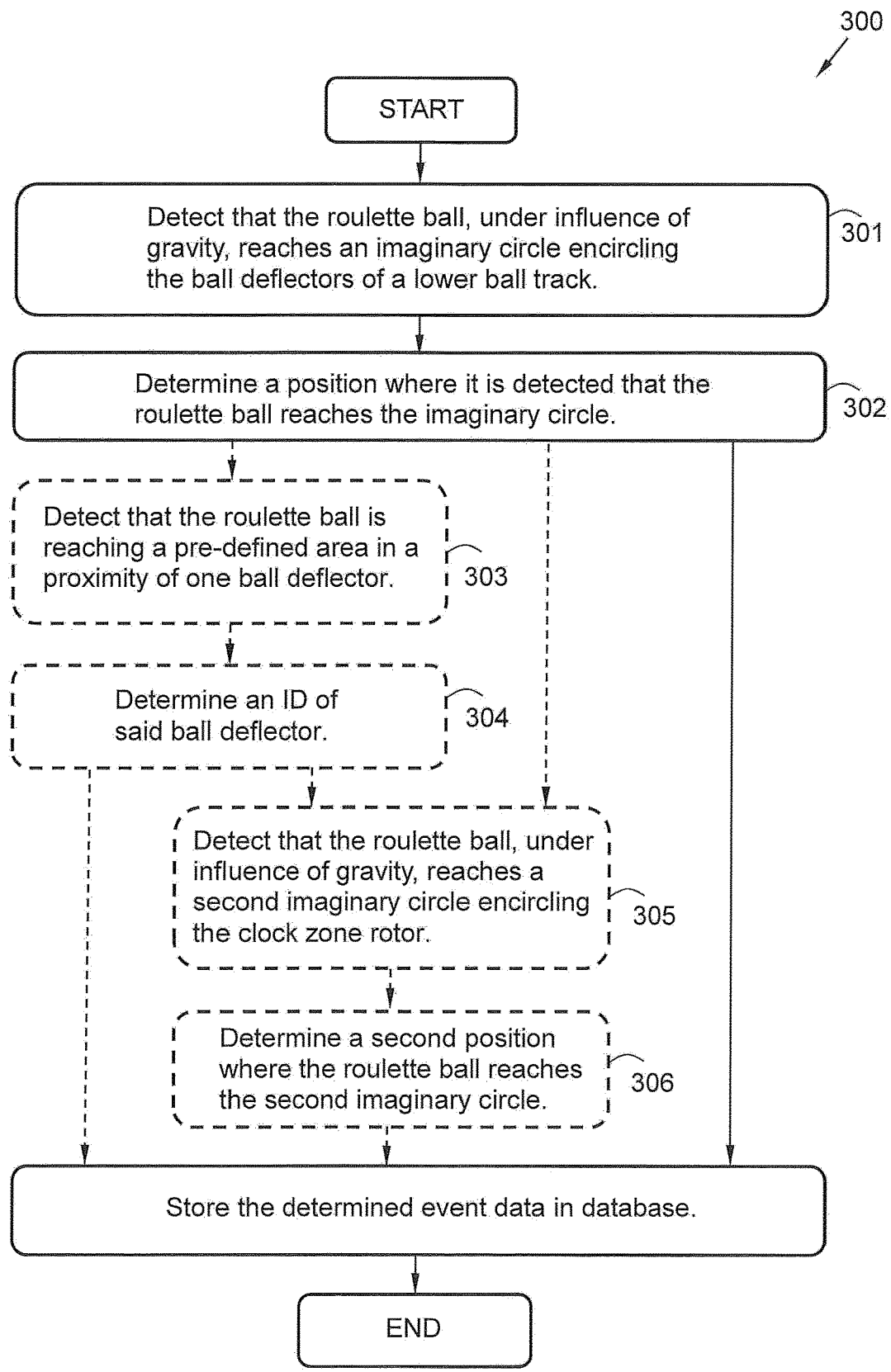
FIG. 3 is a flow chart illustrating a method according to an embodiment.

FIG. 3 is a flow chart illustrating embodiments of a method 300 for detecting event data during a game round of a roulette wheel 1 via a camera 2. Thereby, detection of a roulette wheel bias, may be enabled, based on a comparison between the statistics concerning the event data and an expected distribution of outcome.

The method 300 may be performed on an online casino or a live casino.

The roulette wheel 1 comprises a ball track 11A, upon which a roulette ball 14 is brought into rotation around the roulette wheel 1. Further, the roulette wheel 1 comprises a sloping lower ball track 11B comprising ball deflectors 13, 15, encircling a rotor 7.

To appropriately detect the event data during the game round of the roulette wheel 1 via the camera 2 for enabling detection of the roulette wheel bias, the method 300 may comprise a number of actions 301-307. It is however to be noted that any, some or all of the described actions 301-307, may be performed in a somewhat different chronological order than the enumeration indicates. At least some of the actions 301-307 may be performed simultaneously or even be performed in an at least partly reversed order according to different embodiments. Further, it is to be noted that some actions may be performed only in some alternative embodiments, such as e.g. actions 303-306.

In Action 301, it is detected that the roulette ball 14, under influence of gravity, reaches an imaginary circle 17 encircling the ball deflectors 13, 15 of the lower ball track 11B.

The imaginary circle 17 may touch the upper end of the vertically extended ball deflectors 13 in some embodiments, or alternatively touch the upper end of the horizontally extended ball deflectors 15, touch the centre of the ball deflectors 13, 15, touch the lower end of the horizontally extended ball deflectors 15, touch the lower end of the vertically extended ball deflectors 13, or anywhere there between.

In different embodiments, it may be detected when the edge of the roulette ball 14 reaches the imaginary circle 17, or the gravitational centre of the roulette ball 14 reaches the imaginary circle 17.

Action 302 comprises determining a position where it is detected 301 that the roulette ball 14 reaches the imaginary circle 17.

The position, which may be referred to as a drop zone position may be a continuous angular position around the roulette wheel 1. Alternatively, the roulette wheel 1 may be divided into a predetermined number of drop zones, such as e.g. 4, 8, 16 etc.

Action 303, which may be performed only within some embodiments, comprises detecting that the roulette ball 14 is reaching a pre-defined area 16 in a proximity of one ball deflector 13, 15.

The pre-defined area 16 may in some embodiments be shaped like a conic section, like an ellipse, an oval, a circle etc., in the proximity of each ball deflector 13, 15.

Action 304, which may be performed only within some embodiments wherein action 303 has been performed, comprises determining an identity of said ball deflector 13, 15.

The ball deflectors 13, 15 of the lower ball track 11B may in some embodiments comprise a first subset of horizontally extended ball deflectors 15 and a second subset of vertically extended ball deflectors 13. The ball deflectors may also be referred to as diamonds, due to their shape. The horizontally extended ball deflectors 15 of the first subset may be separated by a vertically extended ball deflector 13 of the second subset.

Action 305, which may be performed only within some embodiments, comprises detecting that the roulette ball 14, under influence of gravity, reaches a second imaginary circle 18 encircling the rotor 7.

The second imaginary circle 18 may be situated where the lower ball track 11B ends, where the rotor 7 begins or somewhere in between.

Action 306, which may be performed only within some embodiments wherein action 305 has been performed, comprises determining a second position where it is detected 305 that the roulette ball 14 reaches the second imaginary circle 18.

In different embodiments, it may be detected when the edge of the roulette ball 14 reaches the second imaginary circle 18, or the gravitational centre of the roulette ball 14 reaches the second imaginary circle 18.

Action 307, comprises storing the event data, i.e. the determined 302 position where it is detected 301 that the roulette ball 14 reaches the imaginary circle 17, in a database 6.

The stored event data may be stored associated with for example an identification reference of the roulette wheel 1, a time stamp and/or a sequential number identifying the particular game round, etc., in some embodiments. Also, results concerning the winning number may be stored in the database 6, or at any other storage means such as a memory.

Further, in embodiments wherein action 303 and 304 have been performed, action 307 may comprise storing the determined 304 identity of said ball deflector 13, 15, e.g. in the database 6, or at any other storage means such as a memory.

Further, in embodiments wherein action 305 and 306 have been performed, action 307 may comprise storing the determined 306 second position where it is detected 305 that the roulette ball 14 reaches the second imaginary circle 18, in the database 6.

Thereby detection of a roulette wheel bias is enabled, by detecting a deviation from collected and stored statistics of a plurality of game rounds. When such deviation from an expected distribution of drop zone statistics is detected, exceeding a threshold limit, an alert may be generated and sent e.g. to the croupier or any other operator. Thereby the croupier may close the wheel for further gaming until appropriate maintenance has been made.

The above described method 300 may be performed by a computer program comprising program code for performing the method 300 according to at least some of the method actions 301-307 when the computer program is executed in the image processing unit 3.

The image processing unit 3 may comprise one or more instances of a processing circuit, i.e. a Central Processing Unit (CPU), a processing unit, a processing circuit, a processor, an Application Specific Integrated Circuit (ASIC), a microprocessor, or other processing logic that may interpret and execute instructions. The herein utilised expression "processor" may thus represent a processing circuitry comprising a plurality of processing circuits, such as, e.g., any, some or all of the ones enumerated above.

The computer program product mentioned above may be provided for instance in the form of a data carrier carrying computer program code for performing at least some of the actions 301-307 according to some embodiments when being loaded into the image processing unit 3. The data carrier may be, e.g., a hard disk, a CD ROM disc, a memory stick, an optical storage device, a magnetic storage device or any other appropriate medium such as a disk or tape that may hold machine readable data in a non-transitory manner. The computer program product may furthermore be provided as computer program code on a server and downloaded to the image processing unit 3 remotely, e.g., over an Internet connection.

As used herein, the term "and/or" comprises any and all combinations of one or more of the associated listed items. The term "or" as used herein, is to be interpreted as a mathematical OR, i.e., as an inclusive disjunction; not as a mathematical exclusive OR (XOR), unless expressly stated otherwise. In addition, the singular forms "a", "an" and "the" are to be interpreted as "at least one", thus also possibly comprising a plurality of entities of the same kind, unless expressly stated otherwise. It will be further understood that the terms "includes", "comprises", "including" and/or "comprising", specifies the presence of stated features, actions, integers, steps, operations, elements, and/or components, but do not preclude the presence or addition of one or more other features, actions, integers, steps, operations, elements, components, and/or groups thereof. A single unit such as e.g. a processor may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms such as via Internet or other wired or wireless communication system.

The invention claimed is:

1. An image processing unit (3), for detecting event data during a game round of a roulette wheel (1) via a camera (2), thereby enabling detection of a roulette wheel bias, which roulette wheel (1) comprises a ball track (11A), upon which a roulette ball (14) is brought into rotation around the roulette wheel (1), and a sloping lower ball track (11B) comprising ball deflectors (13, 15), encircling a rotor (7); wherein the image processing unit (3) is configured for:
 receiving at least one captured image of the roulette ball (14) from the camera (2);
 detecting that the roulette ball (14), under influence of gravity, reaches an imaginary circle (17) encircling the ball deflectors (13, 15) of the lower ball track (11B); and
 determining a position where it is detected that the roulette ball (14) reaches the imaginary circle (17);
 storing the determined position in a database (6), thereby enabling detection of a roulette wheel bias by detecting a deviation from collected and stored statistics of a plurality of game rounds;
 detecting that the roulette ball (14) is reaching a pre-defined area (16) in a proximity of one ball deflector (13, 15); and
 determining an identity of said ball deflector (13, 15);
and wherein the database (6) is further configured for
 storing the determined identity of said ball deflector (13, 15).

2. The image processing unit (3), according to claim 1, wherein said pre-defined area (16) is shaped like a conic section, in the proximity of each ball deflector (13, 15).

3. An image processing unit (3), for detecting event data during a game round of a roulette wheel (1) via a camera (2), thereby enabling detection of a roulette wheel bias, which roulette wheel (1) comprises a ball track (11A), upon which a roulette ball (14) is brought into rotation around the roulette wheel (1), and a sloping lower ball track (11B) comprising ball deflectors (13, 15), encircling a rotor (7); wherein the image processing unit (3) is configured for:
 receiving at least one captured image of the roulette ball (14) from the camera (2);
 detecting that the roulette ball (14), under influence of gravity, reaches an imaginary circle (17) encircling the ball deflectors (13, 15) of the lower ball track (11B); and
 determining a position where it is detected that the roulette ball (14) reaches the imaginary circle (17);
 storing the determined position in a database (6), thereby enabling detection of a roulette wheel bias by detecting a deviation from collected and stored statistics of a plurality of game rounds;
 detecting that the roulette ball (14), under influence of gravity, reaches a second imaginary circle (18) encircling the rotor (7);
 determining a second position where it is detected that the roulette ball (14) reaches the second imaginary circle (18); and
 wherein the database (6) is further configured for storing the determined second position in the database (6).

4. The image processing unit (3) according to claim 3, further configured for determining a continuous position where the roulette ball (14) reaches the imaginary circle (17) and/or determining a continuous second position where the roulette ball (14) reaches the second imaginary circle (18).

5. A method (300) for detecting event data during a game round of a roulette wheel (1) via a camera (2), thereby enabling detection of a roulette wheel bias, which roulette wheel (1) comprises a ball track (11A), upon which a roulette ball (14) is brought into rotation around the roulette wheel (1), and a sloping lower ball track (11B) comprising ball deflectors (13, 15), encircling a rotor (7); wherein the method (300) comprises:
 detecting (301) that the roulette ball (14), under influence of gravity, reaches an imaginary circle (17) encircling the ball deflectors (13, 15) of the lower ball track (11B);
 determining (302) a position where it is detected (301) that the roulette ball (14) reaches the imaginary circle (17);
 storing (307) the determined (302) position in a database (6), thereby enabling detection of a roulette wheel bias by detecting a deviation from collected and stored statistics of a plurality of game rounds;
 detecting (303) that the roulette ball (14) is reaching a pre-defined area (16) in a proximity of one ball deflector (13, 15);
 determining (304) an identity of said ball deflector (13, 15); and
 storing (307) the determined (304) identity of said ball deflector (13, 15) in the database (6).

6. The method (300) according to any of claim 5, further comprising:
 detecting (305) that the roulette ball (14), under influence of gravity, reaches a second imaginary circle (18) encircling the rotor (7);
 determining (306) a second position where it is detected (305) that the roulette ball (14) reaches the second imaginary circle (18); and
 storing (307) the determined (306) second position in the database (6).

7. An image processing unit (3), for detecting event data during a game round of a roulette wheel (1) via a camera (2), thereby enabling detection of a roulette wheel bias, which roulette wheel (1) comprises a ball track (11A), upon which a roulette ball (14) is brought into rotation around the roulette wheel (1), and a sloping lower ball track (11B) comprising ball deflectors (13, 15), encircling a rotor (7); wherein the image processing unit (3) is configured for:
 receiving at least one captured image of the roulette ball (14) from the camera (2);
 detecting that the roulette ball (14), under influence of gravity, reaches an imaginary circle (17) encircling the ball deflectors (13, 15) of the lower ball track (11B), wherein the imaginary circle (17) encircling the ball deflectors (13, 15) is touching the upper end of a subset of vertically extended ball deflectors (13);
 determining a position where it is detected that the roulette ball (14) reaches the imaginary circle (17);

storing the determined position in a database (6), thereby enabling detection of a roulette wheel bias by detecting a deviation from collected and stored statistics of a plurality of game rounds;

detecting that the roulette ball (14) is reaching a pre-defined area (16) in a proximity of one ball deflector (13, 15); and determining an identity of said ball deflector (13, 15);

and wherein the database (6) is further configured for storing the determined identity of said ball deflector (13, 15).

8. The image processing unit (3), according to claim 7, wherein said pre-defined area (16) is shaped like a conic section, in the proximity of each ball deflector (13, 15).

9. A method (300) for detecting event data during a game round of a roulette wheel (1) via a camera (2), thereby enabling detection of a roulette wheel bias, which roulette wheel (1) comprises a ball track (11A), upon which a roulette ball (14) is brought into rotation around the roulette wheel (1), and a sloping lower ball track (11B) comprising ball deflectors (13, 15), encircling a rotor (7); wherein the method (300) comprises:

detecting (301) that the roulette ball (14), under influence of gravity, reaches an imaginary circle (17) encircling the ball deflectors (13, 15) of the lower ball track (11B);

determining (302) a position where it is detected (301) that the roulette ball (14) reaches the imaginary circle (17);

storing (307) the determined (302) position in a database (6), thereby enabling detection of a roulette wheel bias by detecting a deviation from collected and stored statistics of a plurality of game rounds;

detecting (305) that the roulette ball (14), under influence of gravity, reaches a second imaginary circle (18) encircling the rotor (7);

determining (306) a second position where it is detected (305) that the roulette ball (14) reaches the second imaginary circle (18); and storing (307) the determined (306) second position in the database (6).

\* \* \* \* \*